(12) United States Patent
Hattori et al.

(10) Patent No.: US 7,216,895 B2
(45) Date of Patent: May 15, 2007

(54) SEATING DETECTOR

(75) Inventors: Katsu Hattori, Nagoya (JP); Yukihiro Yamamoto, Kariya (JP); Koji Ito, Ama-gun (JP); Yasuaki Hiraki, Nisshin (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 434 days.

(21) Appl. No.: 10/942,850

(22) Filed: Sep. 17, 2004

(65) Prior Publication Data

US 2005/0090958 A1    Apr. 28, 2005

(30) Foreign Application Priority Data

Sep. 17, 2003    (JP) ............... 2003-324706

(51) Int. Cl.
   *B60R 21/16*    (2006.01)
(52) U.S. Cl. ................ 280/735; 180/273; 701/45; 340/667
(58) Field of Classification Search ............... 280/735; 180/273; 701/45, 49; 340/667
   See application file for complete search history.

(56) References Cited

U.S. PATENT DOCUMENTS 5,474,327 A * 12/1995 Schousek .............. 280/735
5,494,311 A *  2/1996 Blackburn et al. ......... 280/735
5,678,854 A * 10/1997 Meister et al. ............ 280/735
5,732,375 A *  3/1998 Cashler ................... 701/45
6,024,378 A *  2/2000 Fu ........................ 280/735

(Continued)

FOREIGN PATENT DOCUMENTS

JP    2000-301980    10/2000

(Continued)

*Primary Examiner*—Paul N. Dickson
*Assistant Examiner*—Leonard McCreary, Jr.
(74) *Attorney, Agent, or Firm*—Buchanan Ingersoll & Rooney PC

(57) ABSTRACT

A seating detector comprises a plurality of cells provided at a seating surface to be defined by rows and columns for detecting partial loads, an unevenness calculating means for calculating the number of cells when a partial pressure detected at the each cell is larger than a partial pressure detected at one abutting cell positioned next to the cell at one side thereof and a partial pressure detected at the other abutting cell positioned next to the cell at the other side thereof, or when a partial pressure detected at the each cell is smaller than a partial pressure detected at one abutting cell positioned next to the cell at one side thereof and a partial pressure detected at the other abutting cell positioned next to the cell at the other side thereof, and a determining means for determining that the seat is occupied by a child restraint system based on a comparison between the number of the cells and a threshold.

5 Claims, 11 Drawing Sheets

U.S. PATENT DOCUMENTS

| | | | |
|---|---|---|---|
| 6,345,839 B1* | 2/2002 | Kuboki et al. | 280/735 |
| 6,348,663 B1* | 2/2002 | Schoos et al. | 177/144 |
| 6,367,837 B1* | 4/2002 | Hamada et al. | 280/735 |
| 6,487,483 B1* | 11/2002 | Gillis | 701/45 |
| 6,490,515 B1 | 12/2002 | Okamura et al. | |
| 6,567,732 B2* | 5/2003 | Drobny et al. | 701/45 |
| 6,845,339 B2* | 1/2005 | Winkler et al. | 702/173 |
| 6,876,912 B2* | 4/2005 | Winkler | 701/45 |
| 6,918,612 B2* | 7/2005 | Smith et al. | 280/735 |
| 2005/0006151 A1* | 1/2005 | Mattson et al. | 177/1 |
| 2005/0043876 A1* | 2/2005 | Fultz et al. | 701/45 |
| 2005/0057026 A1* | 3/2005 | Hattori et al. | 280/735 |
| 2005/0154515 A1* | 7/2005 | Wallace | 701/45 |

FOREIGN PATENT DOCUMENTS

| | | |
|---|---|---|
| JP | 2001-201412 | 7/2001 |
| JP | 2002-87132 | 3/2002 |
| JP | 2003-80989 | 3/2003 |

* cited by examiner

FIG. 3
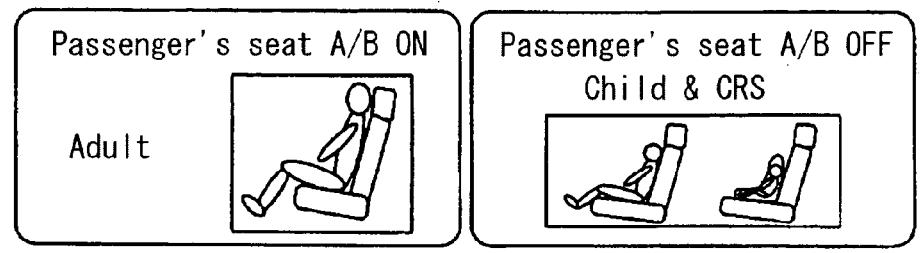
FIG. 4 B    FIG. 4 A
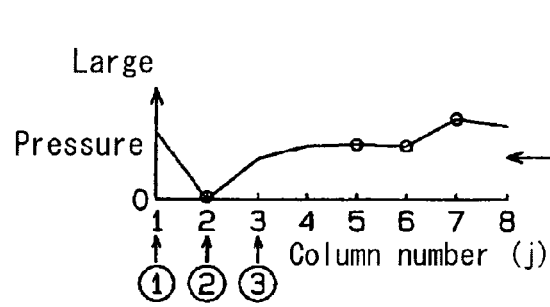
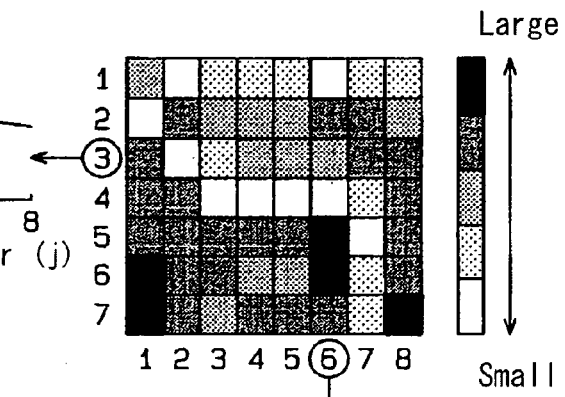
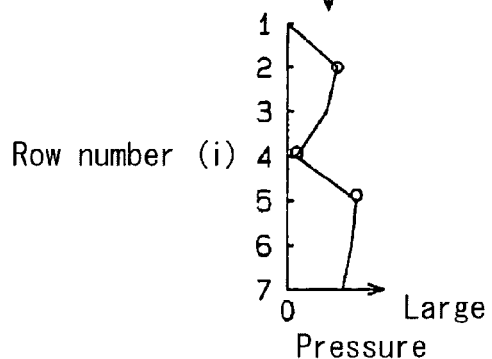
FIG. 4 C

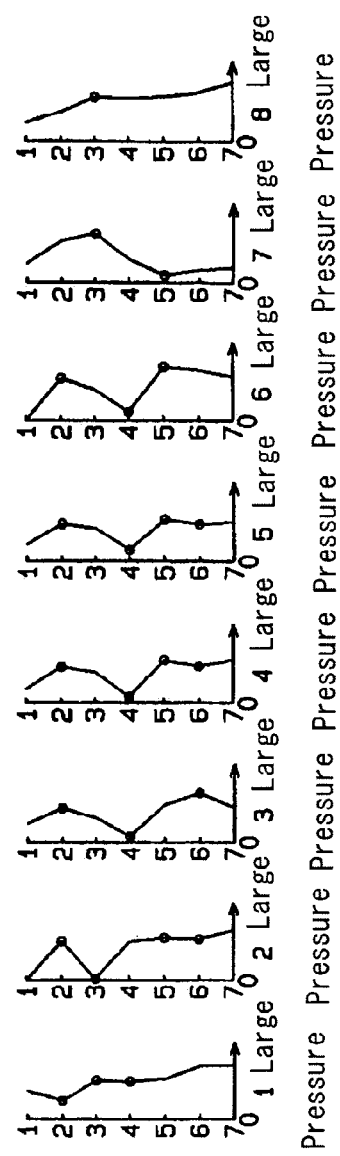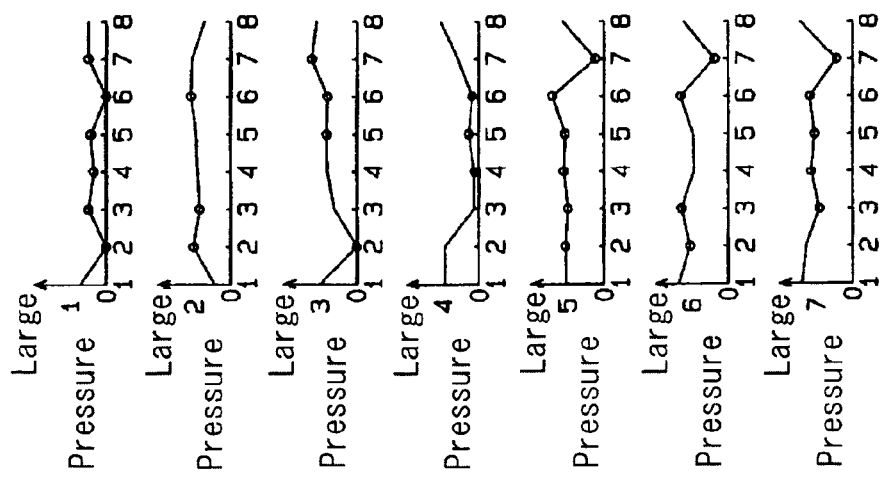

SEATING DETECTOR

CROSS REFERENCE TO RELATED APPLICATIONS

This application is based on and claims priority under 35 U.S.C. § 119 to Japanese Patent Application 2003-324706, filed on Sep. 17, 2003, the entire content of which is incorporated herein by reference.

FIELD OF THE INVENTION

This invention generally relates to a seating detector for detecting whether or not a seat is occupied by a human.

BACKGROUND

Recently, a vehicle equips an air bag apparatus at front portion thereof (on a driver seat or on a passenger seat) for improving safety on a collision. When the vehicle crashes into an object due to an accident, the air bag apparatus outputs a signal (an operation signal) to an air bag actuator based on a signal from the collision-detecting sensor for actuating an inflator and inflating the air bag instantaneously.

On this account, for improving the safety on the vehicle collision, a vehicle having a function for switching a place where the air bag is inflated considering a direction of the impact due to the vehicle collision has been on a market. In this case, the air bag needs to be actuated based on an accurate determination whether or not a passenger is sitting on the vehicle seat. The judge whether or not the passenger is sitting on the vehicle seat, especially on the passenger seat, needs to be done more precisely because such seat may be variously occupied by a adult, a children or a baby on a child seat (Child Restraint System, hereinafter referred to as CRS).

Known seating detectors are disclosed in JP2000-301980A2, JP2001-201412A2, JP2003-80989A2 and JP2002-87132A2.

In JP2000-301980A2 and JP2001-201412A2, the known seating detector proposes a method of a pattern matching for determining a characteristic difference between a CRS and human by examining pressure distribution patterns of each occupant. In JP2003-80989A2, the known seating detector proposes a method for determining a characteristic difference between a CRS and human by examining distances among each peak seating pressures.

In JP2002-87132A2, a known method for determining the occupant is disclosed. Such method determines types of occupant by means of a seating area (total load), template matching, and edges obtained by summing up load differences between the sensors. The values of the total load when the vehicle seat is occupied by the CRS are similar to the values of the total load and the width when the vehicle seat is occupied by an adult or a child, however, according to the template matching, a characteristic of the vehicle seat on which the CRS is attached is different from a characteristic of the vehicle seat which is occupied by human. In addition, according to the edge detection, an edge amount when the vehicle seat is occupied by the CRS is different from an edge amount when the vehicle seat is occupied by human. Thus, the CRS may be misclassified as human when the total load applied to the vehicle seat is relatively large due to a load applied to the vehicle seat when the seat belt is fastening tightly. To improve the detecting accuracy when a high load is applied to the vehicle seat, the template matching and the edge detection are applied to the seat detector.

According to the known seating detector disclosed in JP2000-301980A2 and JP2001-201412A2, the occupant may be misclassified when a shape of a bottom portion of the CRS is similar to a hip shape of human body because a calculated value of the pattern matching when the seat is occupied by the CRS becomes similar to a calculated value of human.

According to the known seating detector disclosed in JP2003-80989A2 the occupant may also be misclassified when the shape of the bottom portion of the CRS is similar to the hip shape of human body because a distance among each peak seating pressure when the seat is occupied by the CRS becomes similar to a distance of human.

According to the known seating detector disclosed in JP2002-87132A2, the occupant may also be misclassified when the shape of the bottom portion of the CRS is similar to the hip shape of human body. In addition, the occupant may be misclassified when a result of the template matching when the CRS is attached on the vehicle seat is similar to a result of the template matching when human is seating on the vehicle seat. Further, when the CRS includes a bottom whose shape cause a small pressure difference on the edge thereof, so that the detecting accuracy may be decreased.

Thus, a need exists for a seating detector to determine whether the seat is occupied by human or occupied by a CRS accurately.

SUMMARY OF THE INVENTION

According to an aspect of the present invention, a seating detector comprises a plurality of cells provided at a seating surface of a seat to be defined by a two-dimensional array including rows and columns for detecting partial loads applied to the seating surface of the seat, an unevenness calculating means for calculating the number of cells when a partial pressure detected at the each cell is larger than a partial pressure detected at one abutting cell positioned next to the cell at one side thereof in one direction and larger than a partial pressure detected at the other abutting cell positioned next to the cell at the other side thereof in one direction, or when a partial pressure detected at the each cell is smaller than a partial pressure detected at one abutting cell positioned next to the cell at one side thereof in one direction and smaller than a partial pressure detected at the other abutting cell positioned next to the cell at the other side thereof in one direction, and a determining means for determining that the seat is occupied by a child restraint system based on a comparison between the number of the cells calculated by the unevenness calculating means and a threshold.

According to another aspect of the present invention, a seating detector comprises a plurality of cells provided at a seating surface of a seat to be defined by a two-dimensional array including rows and columns for detecting partial loads applied to the seating surface of the seat, an unevenness calculating means in a first direction for calculating the number of cells when a partial pressure detected at the each cell is larger than a partial pressure detected at one abutting cell positioned next to the cell at one side thereof in the first direction and larger than a partial pressure detected at the other abutting cell positioned next to the cell at the other side thereof in the first direction, or when a partial pressure detected at the each cell is smaller than a partial pressure detected at one abutting cell positioned next to the cell at one side thereof in the first direction and smaller than a partial pressure detected at the other abutting cell positioned next to the cell at the other side thereof in the first direction, an unevenness calculating means in a second direction for calculating the number of cells when a partial pressure detected at the each cell is larger than a partial pressure detected at one abutting cell positioned next to the cell at one side thereof in the second direction and larger than a partial pressure detected at the other abutting cell positioned next to the cell at the other side thereof in the second direction, or when a partial pressure detected at the each cell is smaller than a partial pressure detected at one abutting cell positioned next to the cell at one side thereof in the second direction and smaller than a partial pressure detected at the other abutting cell positioned next to the cell at the other side thereof in the second direction, an uneven cell totalizing means for adding the number of the cells calculated by the unevenness calculating means in the first direction to the number of the cells calculated by the unevenness calculating means in the second direction, and a determining means for determining that the seat is occupied by a child restraint system based on a comparison between the number of the cells calculated by the uneven cell totalizing means and a threshold.

According to further aspect of the present invention, a seating detector comprises a plurality of cells provided at a seating surface of a seat to be defined by a two-dimensional array including rows and columns for detecting partial loads applied to the seating surface of the seat, a total load value calculating means for calculating a total load value by summing the all partial pressures detected at the respective cells, a determining means for determining that the seat is occupied by an adult based on a comparison between the total load value calculated by the total load value calculating means and a judging threshold, an unevenness calculating means in a first direction for calculating the number of cells when a partial pressure detected at the each cell is larger than a partial pressure detected at one abutting cell positioned next to the cell at one side thereof in the first direction and larger than a partial pressure detected at the other abutting cell positioned next to the cell at the other side thereof in the first direction, or when a partial pressure detected at the each cell is smaller than a partial pressure detected at one abutting cell positioned next to the cell at one side thereof in the first direction and smaller than a partial pressure detected at the other abutting cell positioned next to the cell at the other side thereof in the first direction, an unevenness calculating means in a second direction for calculating the number of cells when a partial pressure detected at the each cell is larger than a partial pressure detected at one abutting cell positioned next to the cell at one side thereof in the second direction and larger than a partial pressure detected at the other abutting cell positioned next to the cell at the other side thereof in the second direction, or when a partial pressure detected at the each cell is smaller than a partial pressure detected at one abutting cell positioned next to the cell at one side thereof in the second direction and smaller than a partial pressure detected at the other abutting cell positioned next to the cell at the other side thereof in the second direction, and an uneven cell totalizing means for adding the number of the cells calculated by the unevenness calculating means in the first direction to the number of the cells calculated by the unevenness calculating means in the second direction, and a correcting means correcting either one of the total load value or the judging threshold so as to control the occupant determination as an adult based on a comparison between the total number of the cells calculated by the uneven cell totalizing means and a threshold.

BRIEF DESCRIPTION OF THE DRAWINGS

The foregoing and additional features and characteristics of the present invention will become more apparent from the following detailed description considered with reference to the accompanying drawings, wherein:

FIG. 3 illustrates explanation views indicating determinations of an actuation of an air bag on a passenger seat;

FIG. 4A illustrates a pressure distribution map detected by the pressure sensors, and FIG. 4B and FIG. 4C illustrates explanation graphs indicating calculating embodiment of a seating surface unevenness;

FIG. 6A illustrates graphs indicating pressure transition in vertical direction when the seat is occupied by a CRS, and FIG. 6B illustrates graphs indicating pressure transition in horizontal direction when the seat is occupied by a CRS□

DETAILED DESCRIPTION

An embodiment of the present invention will be explained hereinbelow referring to attached drawings FIG. 1 through FIG. 13.

Figure 1:
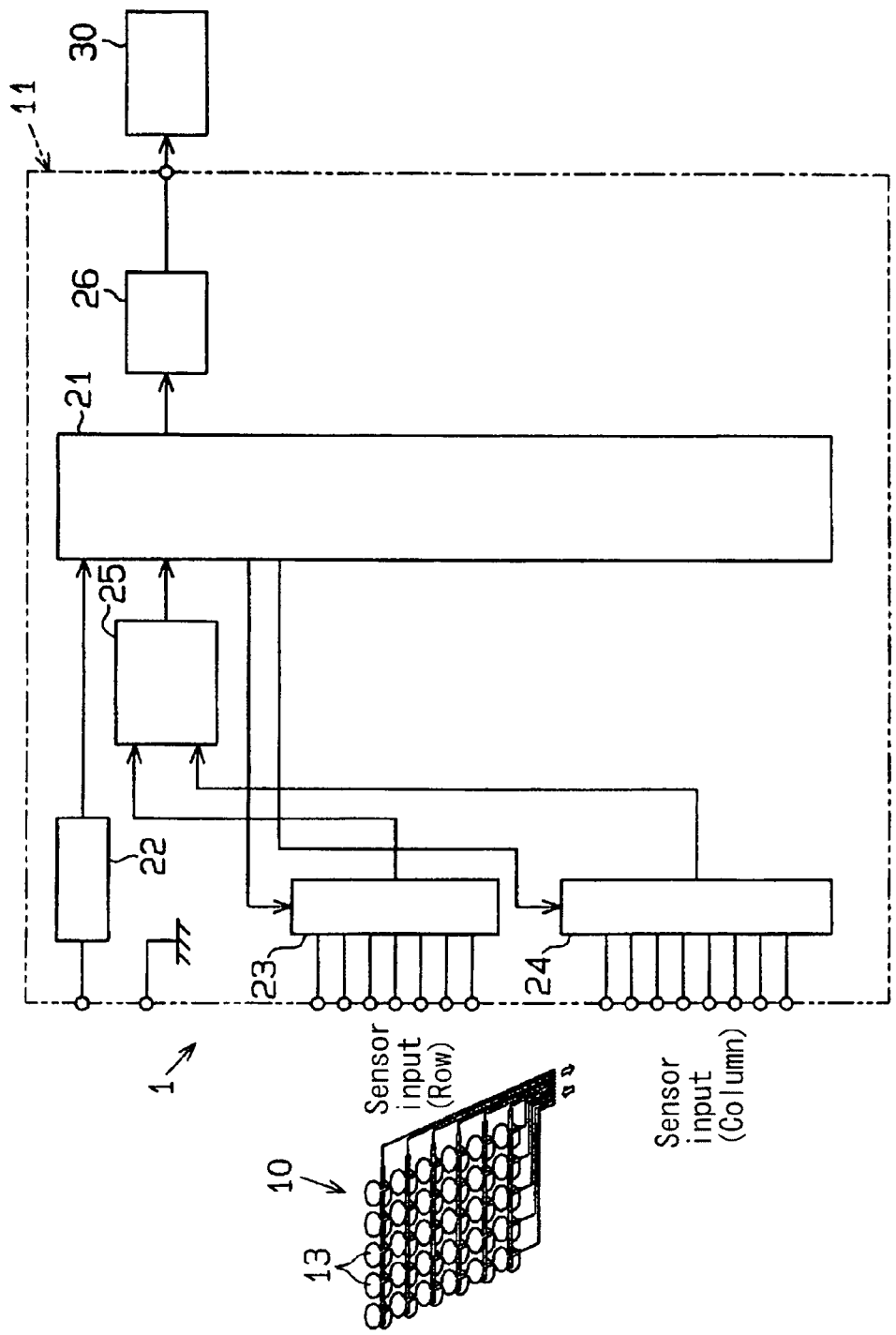
FIG. 1 illustrates a block diagram indicating an electric configuration when a seating detector is mounted to a vehicle.
Figure 2:
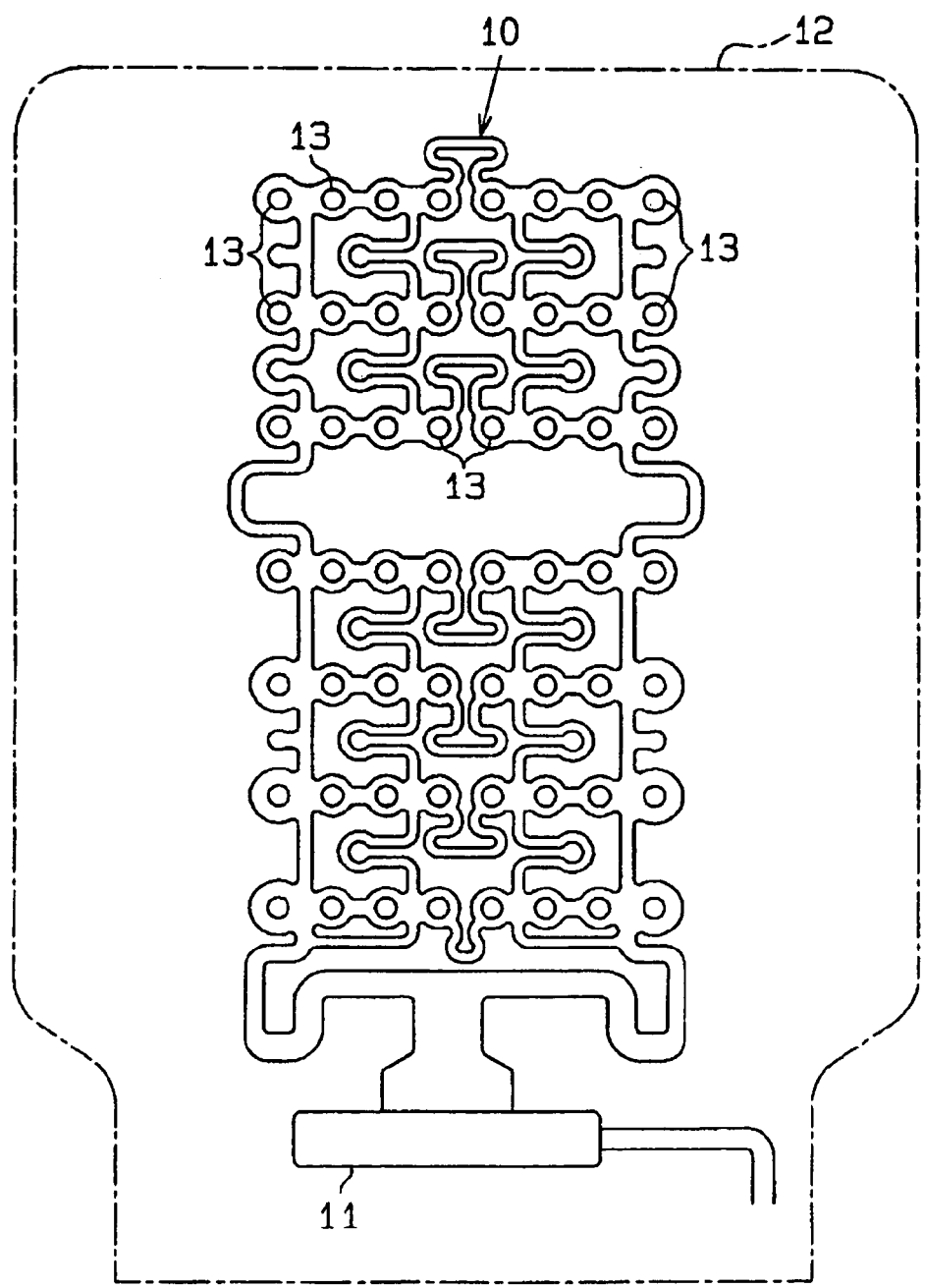
FIG. 2 illustrates a flat view of pressure sensors.

FIG. 1 illustrates a block diagram indicating an electric configuration of the seating detector 1 mounted to a vehicle, and FIG. 2 illustrates a flat view of the configuration of the seating detector 1. As shown in FIG. 2, the seating detector 1 includes a plurality of pressure sensors 10 and a controller 11.

As shown in FIG. 2, the pressure sensors 10 provided on the seating surface of the vehicle seat 12 (seat cushion) includes cells 13 (load sensors) for detecting the pressure applied to the seating surface of the seat. Position of each cells 13 are defined by a matrix structure, specifically a two-dimensional array of rows in a width direction of the vehicle seat (i) and columns in a longitudinal direction of the vehicle seat (j). Each cell 13 provided at a certain position defined by such matrix structure detects a pressure (a partial pressure as a partial load) X (i, j) at the certain position. Each the detected partial pressure X (i, j) is input into the controller 11.

The partial pressures X (i, j) are detected by fifty-six cells 13 provided at the seating surface of the vehicle seat 12 to be a 7×8 matrix array in the embodiment of the current invention, however, such configuration is one of the applicable examples and may be changed.

As shown in FIG. 1, the controller 11 includes a CPU 21 (central processing unit) (a determining means, an unevenness calculating means, an unevenness calculating means in a first direction, an unevenness calculating means in a second direction, an uneven cell totalizing means, a total load value calculating means, a correcting means, an unevenness calculating means in horizontal direction and an unevenness calculating means in vertical direction), a power supply circuit 22, a first switching circuit 23, a second switching circuit 24, an A/D (analog/digital) convert circuit 25 and an output circuit 26.

The CPU 21 determines the seating condition of the vehicle seat 12 based on a controlling program and initial data and the like stored in a ROM (read only memory) in advance. The power supply circuit 22 transforms a voltage of a power (e.g. 12V) provided from the battery (not shown) into a predetermined voltage (e.g. 5V) and supplies the transformed power to the CPU 21.

The first switching circuit 23 and the second switching circuit 24 being connected to the pressure sensor 10 selectively switch the rows and the columns of the pressure sensor 10 based on the switching signal from the CPU 21, and sequentially transmit the detected partial pressure X (i, j) into the A/D convert circuit 25. The partial pressure X (i, j) being an analog signal is converted into a digital signal at the A/D converts circuit 25 and transmitted into the CPU 21.

The CPU 21 temporally stores each partial pressure X (i, j) in the memory respectively. Such partial pressure X (i, j) is used for determining the seating condition of the vehicle seat 12. Generally, possible conditions of the vehicle seat 12 on the passenger's side may be a condition in which an adult is sitting thereon, a condition in which a child is sitting thereon and a condition in which a CRS (a child restraint system or a child seat) is installed thereon. The CPU 21 calculates a total load value by summing up all partial pressures X (i, j) detected at cells 13 and compares such total load value to thresholds. Based on the comparison result, the CPU 21 classifies the condition of the vehicle seat 12 into two types, the condition in which the adult or child is sitting thereon or the CRS is installed thereon.

The seating detector 1 includes a buckle switch 14 (detecting means) to be turned on/off based on the fasten/unfasten condition of a buckle of a seat belt. The buckle switch 14 outputs a signal (hereinbelow referred to as a buckle SW signal) into the CPU 21 through the A/D convert circuit 25. The CPU 21 refers a load characteristic under a condition where the buckle is fastened for determining the seating condition of the vehicle seat 12.

One end of the output circuit 26 is connected to the CPU 21 for transmitting the seating condition of the vehicle seat 12 determined at the CPU 21. The other end of the output circuit is connected to an air bag ECU (electronic control unit) 30 for transmitting a seating signal detected at the ECU 21 and indicating the seating condition of the vehicle seat 12 to the air bag ECU. As shown in FIG. 7, the seating signal transmitted into the air bag ECU 30 permits (turns on) an actuation of the air bag when the adult is sitting on the passenger seat, and not permit (turn off) the actuation of an air bag 31 when the child is sitting or the CRS is installed on the passenger seat.

The air bag ECU 30 outputs a signal (operation signal) into an air bag actuator for actuating an inflator if needed based on the seating signal and a signal from a crash sensor, then the air bags 31 on the driver seat and the passengers seat are inflated instantaneously. In this way, the actuation of the air bag 31 of the passenger seat is preferably controlled based on the seating signal corresponding to the seating condition and the like of the vehicle seat 12.

Figure 5:
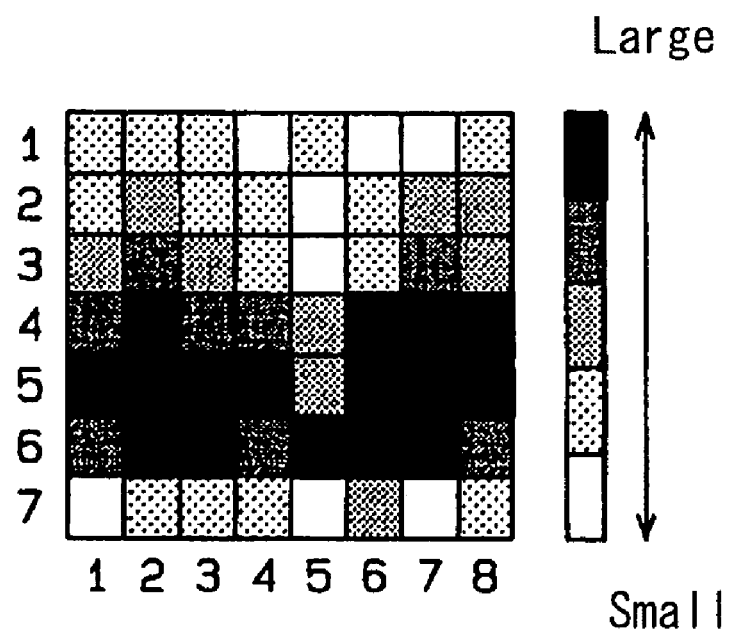
FIG. 5 illustrates a pressure distribution map detected by the pressure sensors when the seat is occupied by an adult of small size.

FIG. 4A and FIG. 5 illustrate examples of distribution maps of detected pressures (pressure distribution) detected by the pressure sensor 10 (cells 13) of the vehicle seat 12 on which a CRS is attached or a human (a human of small size) is sitting. In each pressure distribution map in FIG. 4A and FIG. 5, a horizontal axis represents the width direction of the vehicle seat 12, and a vertical axis represents the longitudinal direction of the vehicle seat 12. The position of the cell 13 is indicated by a combination of numbers allocated on each axis (row numbers and column numbers). In addition, an indicator provided at the right side of each pressure distribution map shows load level (partial pressure level) detected by each cell 13. As shown in FIG. 4A and FIG. 5, there is an apparent difference between the pressure distribution of the vehicle seat 12 on which the CRS is attached and the pressure distribution of the vehicle seat 12 on which the human is sitting.

FIG. 4B and FIG. 4C illustrate graphs of calculated results indicating unevenness of the seating surface used for characterizing the human pressure distribution map and the CRS pressure distribution map. FIG. 4B indicates a pressure transition in horizontal direction in third row. In FIG. 4B, the horizontal axis indicates column numbers, and the vertical axis indicates load values (partial pressure). FIG. 4C indicates a pressure transition in vertical direction in sixth column. In FIG. 4C, the horizontal axis indicates load values (partial pressure), and the vertical axis indicates row numbers.

An unevenness counting number related to the unevenness of the seat in horizontal direction will be explained based on FIG. 4B. In each row (third row in FIG. 4B), a certain partial pressure value (basic partial pressure value) is compared to a left partial pressure values detected at the left cell thereof and the right partial pressure values detected at the right cell thereof. If the basic partial pressure is larger than both the left partial pressure value and the right partial pressure value, "1" is added to the unevenness counting number in horizontal direction. In similar manner, if the basic partial pressure is less than both the left partial pressure and the right partial pressure value, "1" is also added to the unevenness counting number in horizontal direction. In other words, according to FIG. 4B, the direction of the transition of the partial pressure at the left side of the basic partial pressure is different from the direction of the transition of the partial pressure at the right side of the certain partial pressure.

In such configuration, no partial pressure value is detected at the left of the partial pressure of the first column and at the right of the partial pressure of the eight column in FIG. 4A, so that the unevenness counting is executed at from the second column through the seventh column. An example of the comparison of the partial pressure among each cell in horizontal direction will be explained referring to the second column in FIG. 4B. The partial pressure of the second column in FIG. 4B is smaller than the partial pressure of the first column and smaller than the partial pressure of the third column. In other words, the direction of the transition of the partial pressure at the left side of the second column in FIG. 4B is different from the direction of the transition of the partial pressure at the right side of the second column in FIG. 4B. Such transitions of the partial pressures among the first, second and third columns in third row means that an unevenness (depressing) is found around the second column, and in this case, the unevenness counting number in horizontal direction is added by 1. The same process is applied to from the third column through the seventh column. In FIG. 4B, a column where the difference is found between the directions of the transitions at both side thereof in horizontal direction is circled. Specifically, the column which is counted as the unevenness count number in horizontal direction is circled. The partial pressure value of the third column is larger than the partial pressure value of the second column, and the partial pressure value of the forth column is larger than the partial pressure value of the third column. Further, the partial pressure value of the fifth column is larger than the partial pressure value of the fourth column. In this way, the pressure value is continue to be increasing from the second column through the fifth column. Thus, when the direction of the transition of the partial pressure at the left side of the basic partial pressure is same as the direction of the transition of the partial pressure at the right side of the basic partial pressure, the unevenness counting number is not added. In this example, differences of the directions of the pressure transitions are also found from the fifth column through the seventh columns, so that the unevenness counting number is counted up at these columns. Thus, the unevenness counting number of the third row in horizontal direction becomes 4.

Each unevenness counting number in horizontal direction counted at each row is added, and finally, a total of the unevenness counting number in horizontal direction is calculated.

An unevenness counted number related to the unevenness of the seat in vertical direction will be explained based on FIG. 4C. In each column (sixth column in FIG. 4C), a certain partial pressure value (basic partial pressure value) is compared to a upper partial pressure values detected at the upper cell thereof and the lower partial pressure values detected at the lower cell thereof. If the basic partial pressure is larger than both the upper partial pressure value and the lower partial pressure value, "1" is added to the unevenness counting number in vertical direction. In similar manner, if the basic partial pressure is less than both the upper partial pressure and the lower partial pressure value, "1" is also added to the unevenness counting number in vertical direction. In other words, according to FIG. 4C, the direction of the transition of the partial pressure at the upper side of the basic partial pressure is different from the direction of the transition of the partial pressure at the lower side of the certain partial pressure.

In such configuration, no partial pressure value is detected at the upper side of the partial pressure of the first row and at the lower side of the partial pressure of the seventh row in FIG. 4A, so that the unevenness counting is executed at from the second row through the sixth row. An example of the comparison of the partial pressure among each cell in vertical direction will be explained referring to the second row in FIG. 4C. The partial pressure of the second column in FIG. 4C is larger than the partial pressure of the first row and larger than the partial pressure of the third row. In other words, the direction of the transition of the partial pressure at the upper side of the second row in FIG. 4C is different from the direction of the transition of the partial pressure at the lower side of the second row in FIG. 4. Such transitions of the partial pressures among the first, second and third rows in sixth column means that an unevenness (projecting) is found around the second row, and in this case, the unevenness counting number in vertical direction is added by 1. The same process is applied to from the third row through the sixth row. In FIG. 4C, a row where the difference is found between the directions of the transitions at both side thereof in vertical direction is circled. Specifically, the row which is counted as the unevenness count number in vertical direction is circled.

The partial pressure value of the third row is smaller than the partial pressure value of the second row, and the partial pressure value of the forth row is smaller than the partial pressure value of the third row. In addition, the partial pressure value of the sixth row is smaller than the partial pressure value of the fifth row, and the partial pressure value of the seventh row is smaller than the partial pressure value of the sixth row. In this way, the pressure value is continue to be decreasing from the second row through the fourth row and from the fifth row through the seventh row. Thus, when the direction of the transition of the partial pressure at the upper side of the basic partial pressure is same as the direction of the transition of the partial pressure at the lower side of the basic partial pressure, the unevenness counting number is not added. In this example, differences of the directions of the pressure transitions are also found from the fourth column through the fifth rows, so that the unevenness counting number is counted up at these rows. Thus, the unevenness counting number of the sixth column in vertical direction becomes 3.

Each unevenness counting number in vertical direction counted at each column are added, and finally, a total of the unevenness counting number in vertical direction is calculated.

FIG. 6A illustrates graphs of pressure transition in vertical direction at all columns (from first column through eighth column) based on the pressure distribution map (FIG. 4A) when a CRS is attached at the seat. FIG. 6B illustrates graphs of pressure transition in horizontal direction at all rows (from first row through seventh row) based on the pressure distribution map (FIG. 4A) when a CRS is attached at the seat.

A row where the difference is found between the directions of the transitions at both side thereof in vertical direction is circled in FIG. 6A, and a column where the difference is found between the directions of the transitions at both side thereof in horizontal direction is also circled in FIG. 6B. The number of the circles which means unevenness of the partial pressure is relatively large in both FIG. 6A and FIG. 6B. In this example, the unevenness counting number in horizontal direction is "31" and the unevenness counting number in vertical direction is "24", which means the bottom portion of the CRS is supported to the seat at the various uneven point of the bottom portion of the CRS.

Figure 7A:
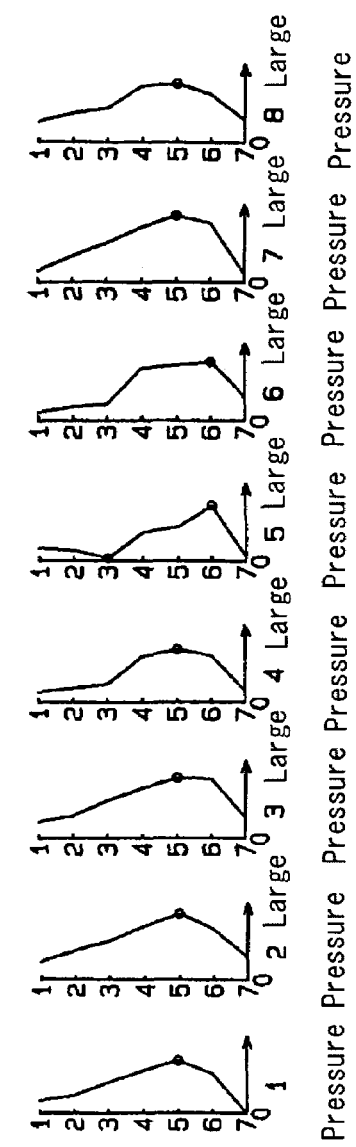
FIG. 7A illustrates graphs indicating pressure transition in vertical direction when the seat is occupied by an adult of small size.
Figure 7B:
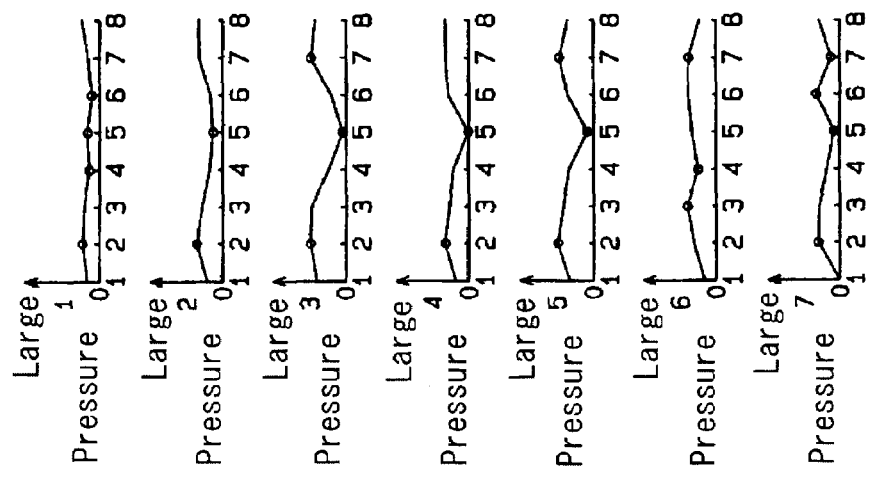
FIG. 7B illustrates graphs indicating pressure transition in horizontal direction when the seat is occupied by an adult of small size□

FIG. 7A illustrates graphs of pressure transition in vertical direction at all columns (from first column through eighth column) based on the pressure distribution map (FIG. 5) when a CRS is attached at the seat. FIG. 7B illustrates graphs of pressure transition in horizontal direction at all rows (from first row through seventh row) based on the pressure distribution map FIG. 5 when a CRS is attached at the seat.

A row where the difference is found between the directions of the transitions at both side thereof in vertical direction is circled in FIG. 7A, and a column where the difference is found between the directions of the transitions at both side thereof in horizontal direction is also circled in FIG. 7B. The number of the circles which means unevenness of the partial pressure is relatively small in both FIG. 7A and FIG. 7B. In this example, the unevenness counting number in horizontal direction is "21" and the unevenness counting number in vertical direction is "9", which means a shape of a human hip is round and smooth.

Further, when the seat is occupied by an adult, the unevenness in horizontal direction is found at center and both sides in width direction of the seating surface because the shape of the human hip is uneven at peak points of left and right hipbones and both left and right thighs, and around the center of the contacting portion with which the seating surface is in contact. In addition, the unevenness in vertical direction is found at rear side in longitudinal direction of the seating surface because the shape of the human hip is uneven around the hipbones.

Thus, the occupant can be determined depending on the number of the unevenness counting number in either one of horizontal direction or vertical direction. In the embodiment, the occupant is determined by the total of the unevenness counting number in horizontal direction and the unevenness counting number in vertical direction (seating surface unevenness counting number) as well to improve the accuracy of the occupant determination.

Figure 8:
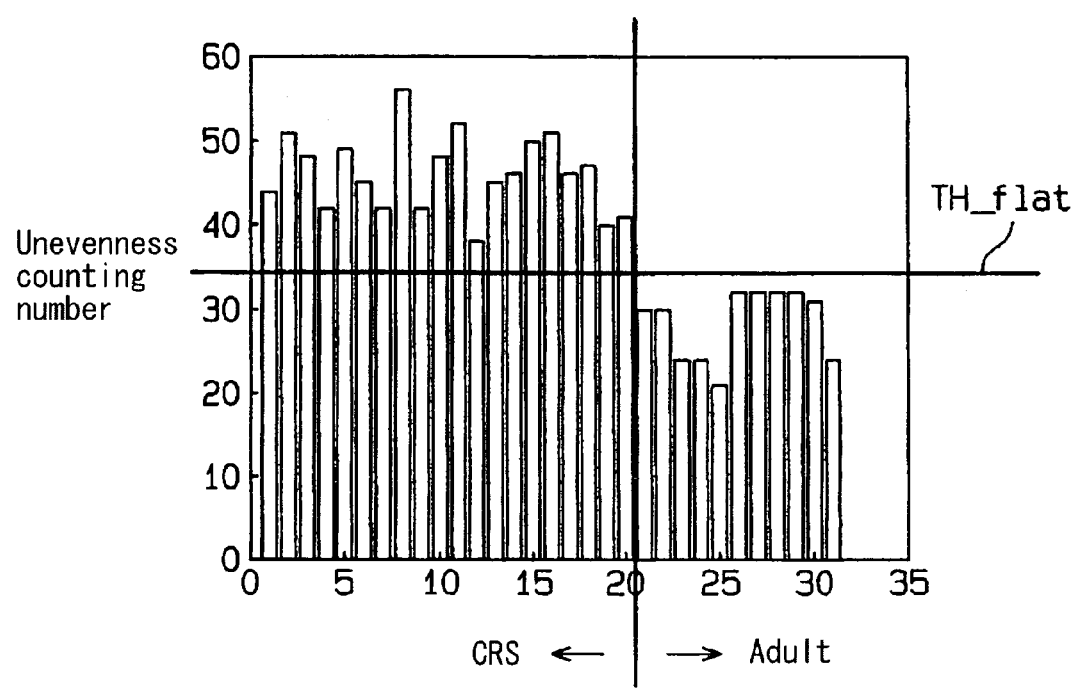
FIG. 8 illustrates graphs indicating calculated results of unevenness counting numbers when the seat is occupied by a CRS or a adult of small size.

FIG. 8 illustrates a graph indicating the calculated seating surface unevenness counting numbers when the seat is occupied by plural types of CRS and adult. The horizontal axis indicates assigned numbers of sample cases, and the vertical axis indicates the corresponding numbers of the seating surface unevenness counting number. The assigned numbers from 1 through 20 indicates the calculated seating surface unevenness counting numbers of 20 types of CRS, and the assigned numbers from 21 through 31 indicates the calculated seating surface unevenness counting number of 11 types of adults. Comparing such seating surface unevenness counting numbers relative to an appropriate threshold (TH_flat), the occupant of the seat can be determined.

A determining process of the seating detector according to the embodiment along with the process executed by the controller 11 will be explained hereinbelow referring to attached drawings FIG. 9 through FIG. 13. The occupant determination by the CPU 21 in the embodiment is mainly based on a judging value corresponding to a total value (total load value) of the partial pressures X (i, j) detected at the all cells 13 of the pressure sensor 10. A coefficient (positive number) of the judging value is added to be increased if there is strong tendency that the seat is occupied by an adult. On the other hand, a coefficient (positive number) of the judging value is deducted to be decreased if there is less tendency that the seat is occupied by an adult, in other words, there is strong tendency that the seat is occupied by a child or a CRS. Thus, the occupant of the seat, an adult, a child or a CRS is determined based on the corrected judging value. Finally, ON/OFF determination for allowing/prohibiting the actuation of the air bag is executed.

Figure 9:
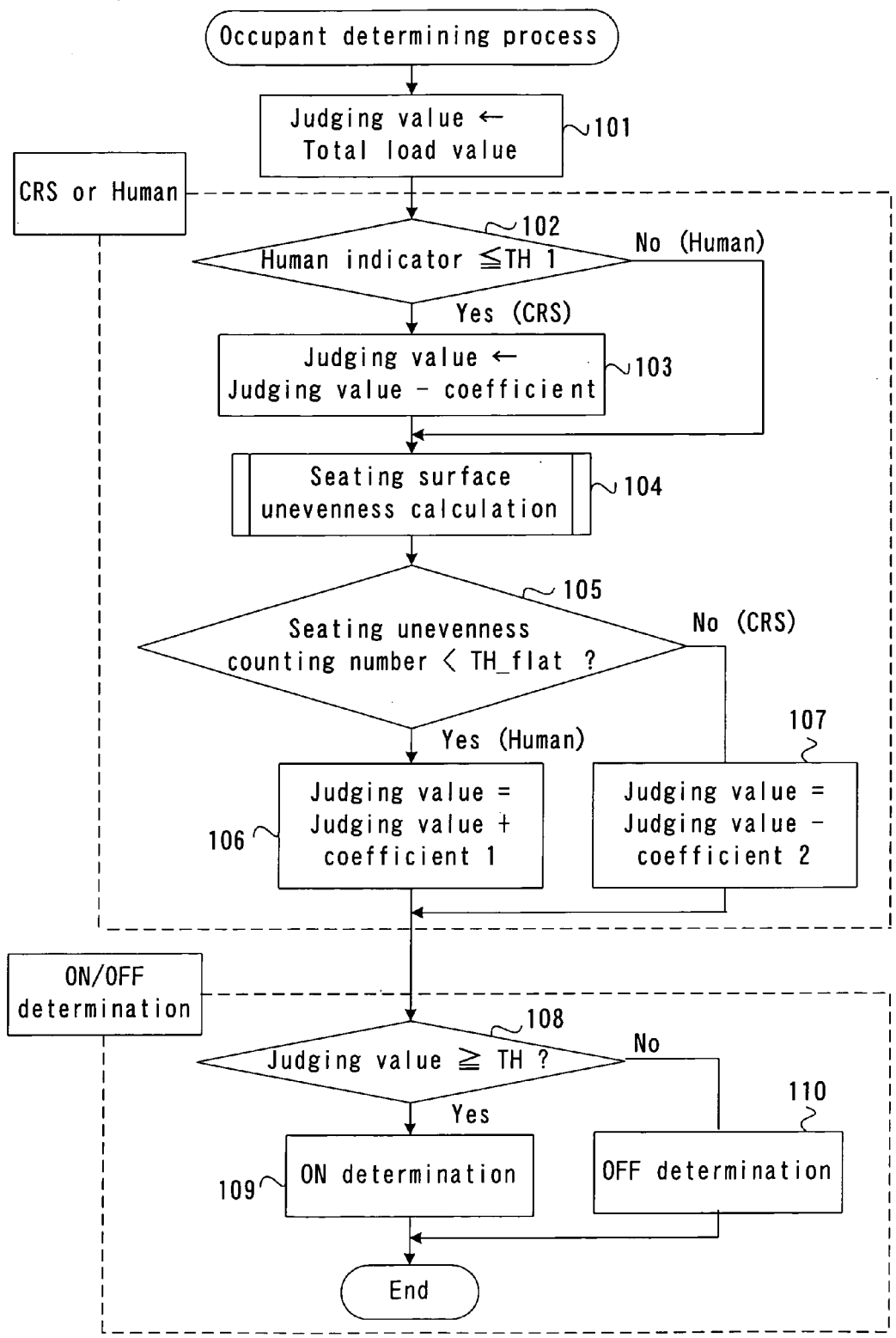
FIG. 9 illustrates a flowchart indicating a part of a determining process.

A routine of the occupant determination process indicated by FIG. 9 is repeated with interrupting at a predetermined interval. First, the CPU 21 obtains data of the partial pressures X (i, j) detected at the cells 13 of the pressure sensor 10 and calculates the total of the partial pressures X (i, j) to obtain the total load value. The CPU 21 stores the total load value in a memory as the judging value and proceeds to Step 102.

In Step 102, the CPU 21 determines "human indicator". The meaning of "human indicator" will be explained as follows. Generally, the pressure distribution maps of the partial pressures X (i, j) detected at the vehicle seat 12 on each condition that the passenger is sitting thereon and the CRS is installed thereon have different characters. Specifically, a certain level of the partial pressure is detected at the cell provided at the center portion of the vehicle seat 12 on which the passenger is sitting, on the other hand, a certain level of the partial pressure is detected at the cell provided at the peripheral side of the vehicle seat 12 on which the CRS is installed. In other word, the pressure distribution of the partial pressures X (i, j) of the vehicle seat 12 on which the passenger is sitting has a reversed character of the pressure distribution of the partial pressures X (i, j) of the vehicle seat 12 on which the CRS is installed.

Figure 10:
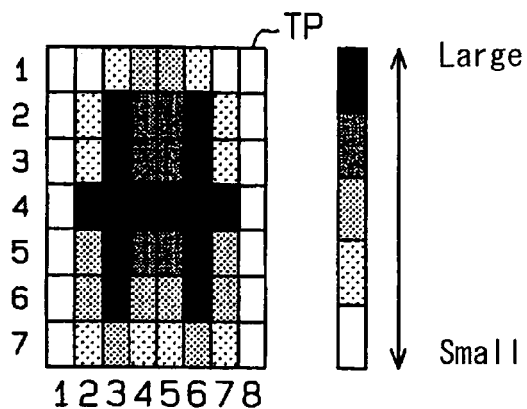
FIG. 10 illustrates an explanation diagram related to human indicator.
Figure 11:
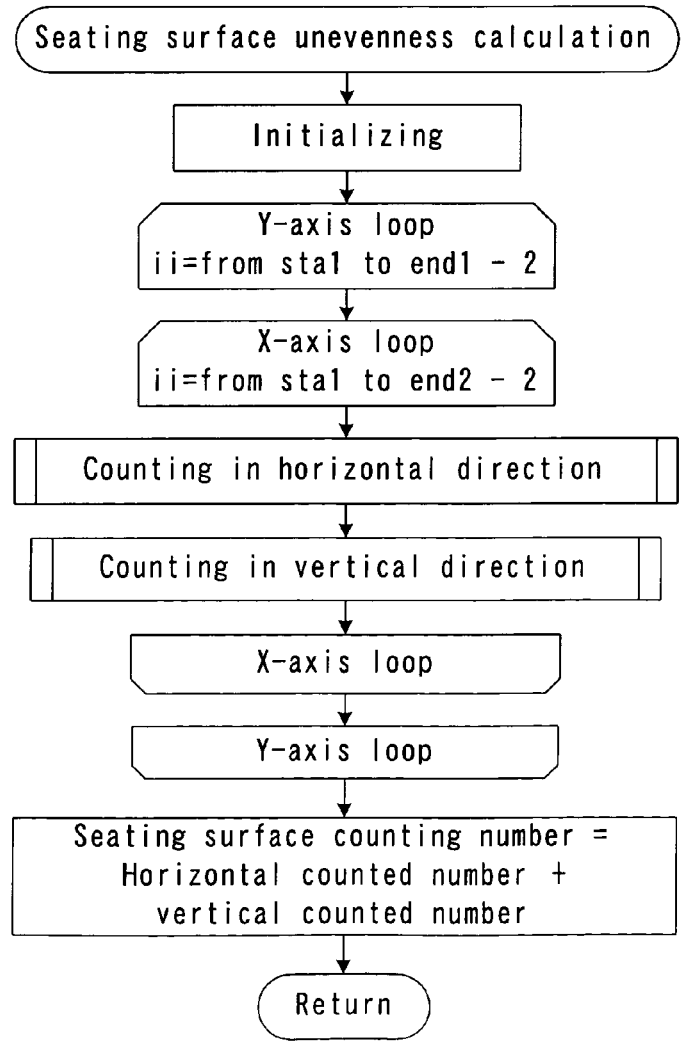
FIG. 11 illustrates a flowchart indicating a part of the determining process.

In the embodiment of the current invention, as shown in FIG. 10, a base pressure template TP comprehensively indicating the condition that the passenger is sitting on the vehicle seat 12, and setting a base pressure TEMP (i, j) at each cell 13 approximately preventing the tendency of the CRS obtained from the experimental value is stored in the ROM. The base pressure template TP indicates a distribution of the base pressure TEMP (i, j) being in an array of the 7×8 matrix corresponding to a shape of the pressure sensor 10. The average of the base pressure TEMP (i, j) provided at each cell 13 is set to a value of "zero". (In FIG. 10, actual pressure is illustrated for convenience.)

Then, the "human indicator" is calculated by summing up the products of the partial pressures X (i, j) detected at each cells 13 and the corresponding base pressures TEMP (i, j). In this case, when the partial pressure X (i, j) detected at each cell 13 and the base pressure TEMP (i, j) of the corresponding cell 13 have the same character, the value becomes a plus number, and the "human indicator" is increased. On the other hand, the partial pressure X (i, j) detected at each cell 13 and the base pressure TEMP (i, j) of the corresponding cell 13 indicate the reversed character, the value becomes a minus number, and the "human indicator" is decreased. Therefore, the CPU 21 detects whether or not the character of result of the pressure sensor 10 is similar to the character of the base pressure template TP based on the plus number or the minus number of the calculated "human indicator". That is, whether or not the passenger is sitting on the vehicle seat 12 is indicated by polarity of the "human indicator" (positive or negative).

In Step 102, the CPU 21 detects whether or not the aforementioned "human indicator" is equal to or less than a predetermined threshold TH1. The predetermined threshold TH1 is set to be a preferable value showing that the vehicle seat is more likely to be not occupied by the adult. When the "human indicator" is equal to or less than the predetermined threshold TH1, the CPU 21 determines that the passenger is not sitting on the vehicle seat (the CRS is installed thereon), then proceeds to Step 103. The CPU 21 deducts coefficient 1 from the determining value and sets the deducted value to the determining value, then goes to Step 104. On the other hand, when the "human indicator" is more than the predetermined threshold 4, the CPU 21 determines that the passenger is sitting on the vehicle seat, then goes to Step 104. Such correction of the determining value based on the "human indicator" results in reducing the number of misjudge that the CRS is installed on the vehicle seat when the adult passenger is sitting on the vehicle seat.

The CPU 21 executes a subroutine of a seating surface unevenness calculation for obtain the seating surface unevenness counting number which is a total of the unevenness counting number in horizontal direction and the unevenness counting number in vertical direction. First, the CPU 21 proceeds to Step 201 in FIG. 11. In Step 201, the CPU 21 initializes a counter ii of the unevenness counting number in vertical direction, and a counter jj of the unevenness counting number in horizontal direction. Then, the CPU 21 proceeds to a Y-axis loop of Step 202a and 202b for scanning in vertical direction, and an X-axis loop of Step 203a and 203b for scanning in horizontal direction. During such scanning process, the CPU proceeds to a subroutine of Step 204 for calculating the unevenness counting number (flatx_cnt) in horizontal direction and a subroutine of Step 205 for calculating the unevenness counting number (flaty_cnt) in vertical direction.

Cells 13 on both end of the seating surface in horizontal direction are not scanned to calculate the unevenness counting number flatx_cnt in horizontal direction, so that the unevenness counting number in certain row can be obtained by scanning the counter (jj) in horizontal direction is repeated from 1 (=sta2) to 6 (=end2−2) which means 6 (=8−2) times. Further, scanning the counter (ii) in vertical direction, the unevenness counting number flatx_cnt in horizontal direction in the seating surface can be obtained.

On the other hand, Cells 13 on both end of the seating surface in vertical direction are not scanned to calculate the unevenness counting number flaty_cnt in vertical direction, so that the unevenness counting number in certain column can be obtained by scanning the counter (jj) in horizontal direction is repeated from 1 (=sta1) to 5 (=end1−2) which means 5 (=7−2) times. Further, scanning the counter (ii) in vertical direction, the unevenness counting number flaty_cnt in vertical direction in the seating surface can be obtained.

The CPU proceeds to Step 206. In Step 206, the seating surface unevenness counting number is calculated by adding the unevenness counting number in vertical direction flatx_cnt and the unevenness counting number in horizontal direction flaty_cnt. The CPU goes back to the original routine and proceeds to Step 105. In step 105, the CPU determines whether or not the calculated seating surface unevenness counting number is smaller than a predetermined threshold TH_flat (shown in FIG. 8).

If it is determined that the seating surface unevenness counting number is smaller than the threshold TH_flat, the CPU 21 determines that the seat is occupied by a human and proceeds to Step 106. In Step 106, the CPU 21 adds a predetermined coefficient 1 to the judging value and updates such increased judging value as a new judging value. On the other hand, if it is determined that the seating surface unevenness counting number is equal to or more than the threshold TH_flat, the CPU 21 determines that the seat is not occupied by a human (occupied by a CRS) and proceeds to Step 107. In Step 107, the CPU 21 deducts a predetermined coefficient 2 to the judging value and updates such deducted value as a new judging value. Such correction of the judging value corresponding to the seating surface unevenness counting number prevents misjudge of the occupant make it easy to determine that the seat is occupied by an adult when the seat is occupied by a human, or make it easy to determine that the seat is not occupied by an adult when the seat is not occupied by a human.

The CPU 21 updates the judging value in Step 106 and Step 107 and proceeds to Step 108. In Step 108, the CPU 21 determines whether or not the corrected judging value id equal to or more than a predetermined judging value threshold TH. The judging value threshold TH is set to be a preferable value to classify three conditions; the seat is occupied by a child, the seat is occupied by a CRS or the seat is occupied by an adult of small size based on the judging value. If the judging value is equal to or more than the judging value threshold TH, the CPU 21 determines that the seat is occupied by an adult and proceeds to Step 109. In Step 109, the "ON" determination to output a seating signal for allowing (on) the actuation of the air bag. On the other hand, if the judging value is less than the judging value threshold TH, the CPU 21 determines that the seat is not occupied by an adult (occupied by a child or a CRS) and proceeds to Step 110. In Step 110, the "OFF" determination to output a seating signal for prohibiting (off) the actuation of the air bag.

The CPU 21 is temporally ended after the ON/OFF determination in Step 109 or Step 110.

Figure 12:
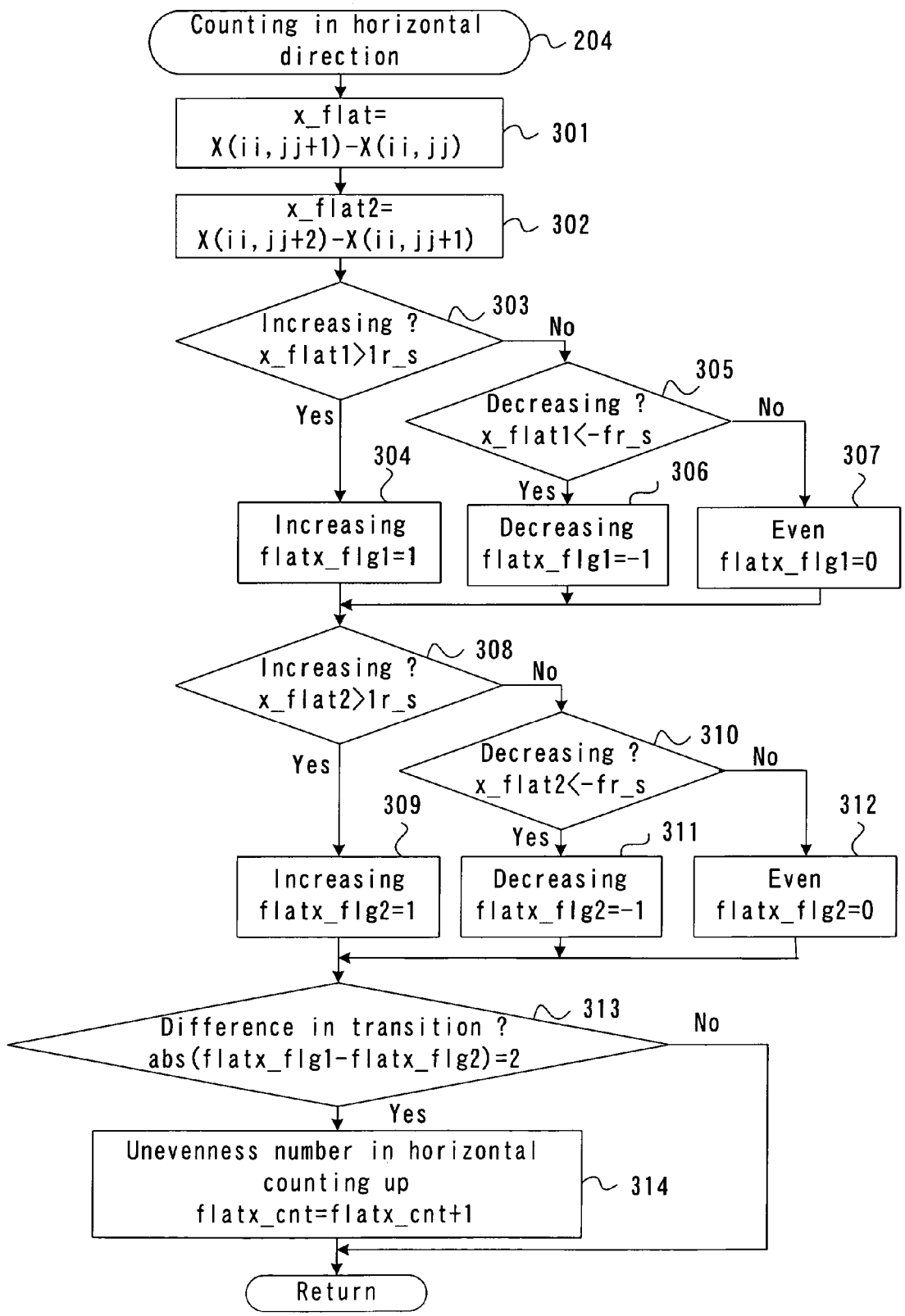
FIG. 12 illustrates a flowchart indicating a part of the determining process.

A counting process in horizontal direction in Step 204 will be explained based on a flowchart in FIG. 12. As shown in FIG. 12, the CPU 21 proceeds to Step 301. In Step 301, the CPU 21 set a basic cell 13 at the row number (ii) and the column number (jj+1). Then, the CPU 21 calculates a left increasing amount x_flat1 by deducting a partial pressure X (ii, jj) detected at a cell 13 provided next to the basic cell 13 in horizontal direction at one side of the basic cell 13 (left side in FIG. 2) from the partial pressure X (ii, jj+1) detected at the basic cell 13. The CPU 21 proceeds to Step 302. In Step 302, the CPU 21 calculates a right increasing amount x_flat2 by deducting the partial pressure (ii, jj+1) detected at the basic cell 13 from a partial pressure X (ii, jj+2) detected at a cell 13 provided next to the basic cell 13 in horizontal direction at the other side of the basic cell 13 (right side in FIG. 2). As aforementioned above, the column number of the basic cell 13 (jj+1) is in a range from 2 to 7.

The CPU proceeds to Step 303. In Step 303, it is determined whether or not the left increasing amount x_flat1 is larger than a predetermined threshold lr_s to determine whether or not the partial pressure is increasing. The threshold lr_s absorbs an error of the partial pressure and is set to be a preferable value (positive number) for determining an increment due to the absorbed error.

In Step 303, if it is determined that the left increasing amount x_flat1 is larger than the predetermined threshold lr_s, the CPU 21 proceeds to Step 304. In Step 304, a flag flattx_flg1 is set to be "1". On the other hand, it is determined that the left increasing amount x_flat1 is equal to or smaller than the predetermined threshold lr_s, the CPU 21 proceeds to Step 305.

In Step 305, it is determined whether or not the left increasing amount x_flat1 is smaller than a predetermined threshold (−fr_s) to determine whether or not the partial pressure is decreasing. The threshold (−fr_s) absorbs an error of the partial pressure and is set to be a preferable value (negative number) for determining a increment due to the absorbed error.

In Step 305, if it is determined that the left increasing amount x_flat1 is smaller than the predetermined threshold (−fr_s), the CPU 21 proceeds to Step 306. In Step 306, a flag flattx_flg1 is set to be "−1". Further, it is determined that the left increasing amount x_flat1 is equal to the predetermined threshold (−fr_s), the CPU 21 proceeds to Step 307. In Step 307, a flag flattx_flg1 is set to be "0".

When the threshold lr_s and threshold (−fr_s) are set to be "0", a little partial pressure icrease/decreace can be detected. Thus, detecting accuracy is adjustable by changing such thresholds.

After determining the increasing or decreasing of the partial pressure at the left side of the basic cell 13 in either one of Steps 304, 306 or 307, The CPU proceeds to Step 308.

In Step 308, it is determined whether or not the right increasing amount x_flat2 is larger than a predetermined threshold lr_s to determine whether or not the partial pressure is increasing. The threshold lr_s absorbs an error of the partial pressure and is set to be a preferable value (positive number) for determining an increment due to the absorbed error.

In Step 308, if it is determined that the right increasing amount x_flat2 is larger than the predetermined threshold lr_s, the CPU 21 proceeds to Step 309. In Step 309, a flag flattx_flg2 is set to be "1". On the other hand, it is determined that the right increasing amount x_flat2 is equal to or smaller than the predetermined threshold lr_s, the CPU 21 proceeds to Step 310.

In Step 310, it is determined whether or not the right increasing amount x_flat2 is smaller than a predetermined threshold (−fr_s) to determine whether or not the partial pressure is decreasing. The threshold (−fr_s) absorbs an error of the partial pressure and is set to be a preferable value (negative number) for determining a increment due to the absorbed error.

In Step 310, if it is determined that the right increasing amount x_flat2 is smaller than the predetermined threshold (−fr_s), the CPU 21 proceeds to Step 311. In Step 311, a flag flattx_flg2 is set to be "−1". Further, it is determined that the right increasing amount x_flat2 is equal to the predetermined threshold (−fr_s), the CPU 21 proceeds to Step 312. In Step 312, a flag flattx_flg2 is set to be "0".

When the threshold lr_s and threshold (−fr_s) are set to be "0", a little partial pressure icrease/decreace can be detected. Thus, detecting accuracy is adjustable by changing such thresholds.

After determining the increasing or decreasing of the partial pressure at the right side of the basic cell 13 in either one of Steps 309, 311 or 312, The CPU proceeds to Step 313.

Based on an absolute value of a difference between the flag flatx_flg1 and the flag flatx_flg2, the CPU 21 determines whether or not the direction of the pressure transition found at the left side of the basic cell 13 is different from the direction of the pressure transition found at the right side of the basic cell 13. When one flag is "1" and the other flag is "−1", which means when the direction of the pressure transition at the left side is different from the direction of the pressure transition at the right side, an absolute value of a difference between such flags becomes "2". Thus, the CPU 21 determines that there is a difference between the direction of the pressure transition at the left side is different from the direction of the pressure transition at the right side when the absolute value of the difference between the flag flatx_flg1 and the flag flatx_flg2 is "2". On the other hand, when the absolute value of the difference between the flag flatx_flg1 and the flag flatx_flg2 is not "2", the CPU 21 determines that there is no difference between the direction of the pressure transition at the right and the direction of the pressure transition at the light. When the absolute value is "2", the CPU 21 proceeds to Step 314. In Step 314, the unevenness counting number flatx_cnt in vertical direction is increased by 1 and updated. On the other hand, when the absolute value is not "2", the unevenness counting number flatx_cnt in horizontal direction is not updated.

The CPU executes the aforementioned process relative to cells in the row (ii) and the all columns except both ends (from the second column through the seventh column). Such process applied to all rows (from the first row through the seventh row) and finally the unevenness counting number flatx_cnt in vertical direction can be calculated.

Figure 13:
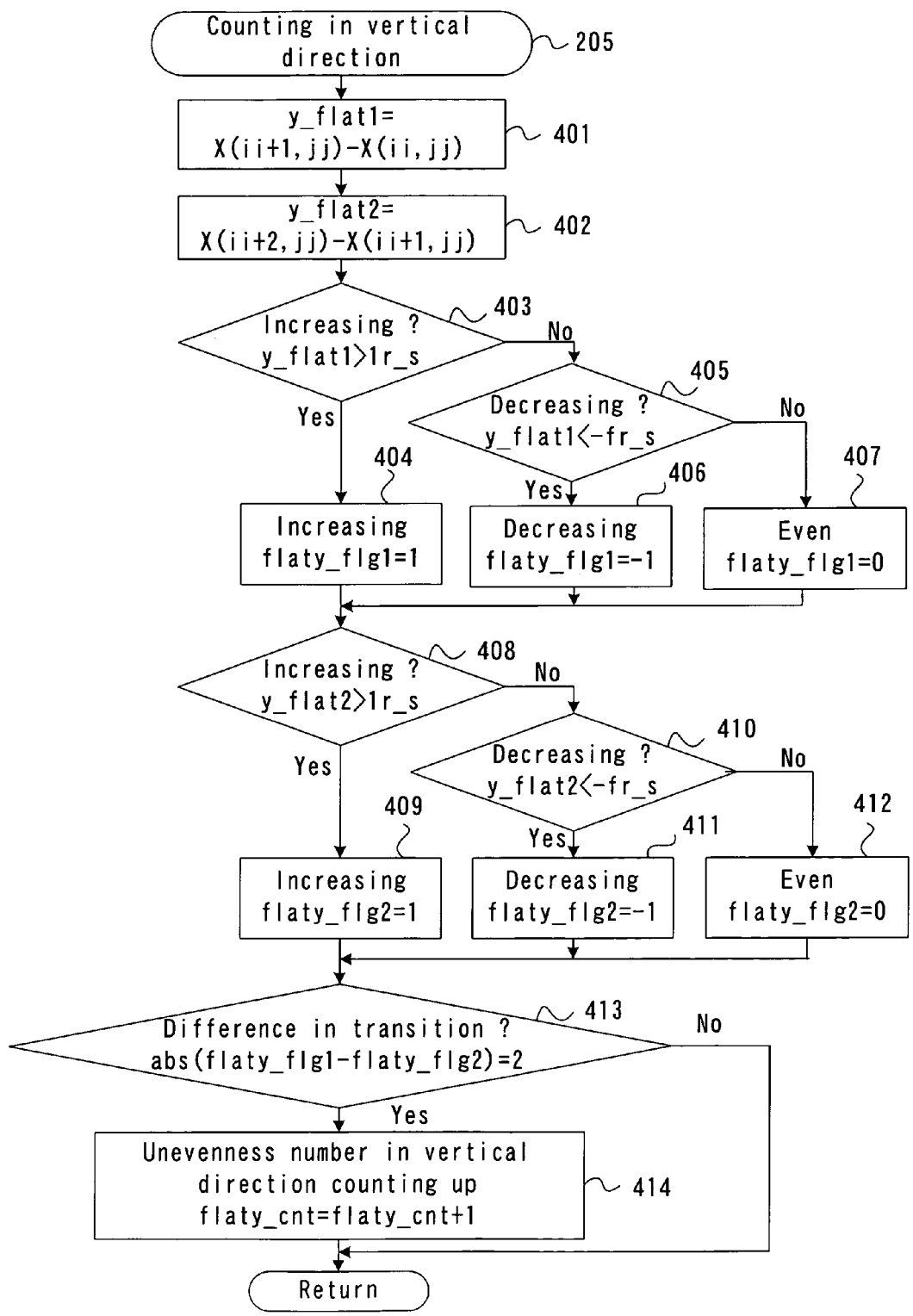
FIG. 13 illustrates a flowchart indicating a part of the determining process.

A counting process in vertical direction in Step 205 will be explained based on a flowchart in FIG. 13. As shown in FIG. 13, the CPU 21 proceeds to Step 401. In Step 401, the CPU 21 set a basic cell 13 at the row number (ii+1) and the column number (jj). Then, the CPU 21 calculates an upper increasing amount y_flat1 by deducting a partial pressure X (ii, jj) detected at a cell 13 provided next to the basic cell 13 in vertical direction at one side of the basic cell 13 (upper side in FIG. 2) from the partial pressure X (ii+1, jj) detected at the basic cell 13. The CPU 21 proceeds to Step 402. In Step 402, the CPU 21 calculates a lower increasing amount y_flat2 by deducting the partial pressure (ii+1, jj) detected at the basic cell 13 from a partial pressure X (ii+2, jj) detected at a cell 13 provided next to the basic cell 13 in vertical direction at the other side of the basic cell 13 (lower side in FIG. 2). As aforementioned above, the column number of the basic cell 13 (ii+1) is in a range from 2 to 6.

The CPU proceeds to Step 403. In Step 403, it is determined whether or not the upper increasing amount y_flat1 is larger than a predetermined threshold lr_s to determine whether or not the partial pressure is increasing. The threshold lr_s absorbs an error of the partial pressure and is set to be a preferable value (positive number) for determining an increment due to the absorbed error.

In Step 403, if it is determined that the upper increasing amount y_flat1 is larger than the predetermined threshold lr_s, the CPU 21 proceeds to Step 404. In Step 404, a flag flatty_flg1 is set to be "1". On the other hand, it is determined that the upper increasing amount y_flat1 is equal to or smaller than the predetermined threshold lr_s, the CPU 21 proceeds to Step 405.

In Step 405, it is determined whether or not the upper increasing amount y_flat1 is smaller than a predetermined threshold (−fr_s) to determine whether or not the partial pressure is decreasing. The threshold (−fr_s) absorbs an error of the partial pressure and is set to be a preferable value (negative number) for determining a increment due to the absorbed error.

In Step 405, if it is determined that the upper increasing amount y_flat1 is smaller than the predetermined threshold (−fr_s), the CPU 21 proceeds to Step 406. In Step 406, a flag flatty_flg1 is set to be "−1". Further, it is determined that the upper increasing amount y_flat1 is equal to the predetermined threshold (−fr_s), the CPU 21 proceeds to Step 407. In Step 407, a flag flatty_flg1 is set to be "0".

When the threshold lr_s and threshold (−fr_s) are set to be "0", a little partial pressure icrease/decreace can be detected. Thus, detecting accuracy is adjustable by changing such thresholds.

After determining the increasing or decreasing of the partial pressure at the upper side of the basic cell 13 in either one of Steps 404, 406 or 407, The CPU proceeds to Step 408.

In Step 408, it is determined whether or not the lower increasing amount y_flat2 is larger than a predetermined threshold lr_s to determine whether or not the partial pressure is increasing. The threshold lr_s absorbs an error of the partial pressure and is set to be a preferable value (positive number) for determining an increment due to the absorbed error.

In Step 408, if it is determined that the lower increasing amount y_flat2 is larger than the predetermined threshold lr_s, the CPU 21 proceeds to Step 409. In Step 409, a flag flatty_flg2 is set to be "1". On the other hand, it is determined that the lower increasing amount y_flat2 is equal to or smaller than the predetermined threshold lr_s, the CPU 21 proceeds to Step 410.

In Step 410, it is determined whether or not the lower increasing amount y_flat2 is smaller than a predetermined threshold (−fr_s) to determine whether or not the partial pressure is decreasing. The threshold (−fr_s) absorbs an error of the partial pressure and is set to be a preferable value (negative number) for determining a increment due to the absorbed error.

In Step 410, if it is determined that the lower increasing amount y_flat2 is smaller than the predetermined threshold (−fr_s), the CPU 21 proceeds to Step 411. In Step 411, a flag flatty_flg2 is set to be "−1". Further, it is determined that the lower increasing amount y_flat2 is equal to the predetermined threshold (−fr_s), the CPU 21 proceeds to Step 412. In Step 412, a flag flatty_flg2 is set to be "0".

When the threshold lr_s and threshold (−fr_s) are set to be "0", a little partial pressure icrease/decreace can be detected. Thus, detecting accuracy is adjustable by changing such thresholds.

After determining the increasing or decreasing of the partial pressure at the right side of the basic cell 13 in either one of Steps 409, 411 or 412, The CPU proceeds to Step 413.

Based on an absolute value of a difference between the flag flaty_flg1 and the flag flatty_flg2, the CPU 21 determines whether or not the direction of the pressure transition found at the upper side, of the basic cell 13 is different from the direction of the pressure transition found at the lower side of the basic cell 13. When one flag is "1" and the other flag is "−1", which means when the direction of the pressure transition at the upper side is different from the direction of the pressure transition at the lower side, an absolute value of a difference between such flags becomes "2". Thus, the CPU 21 determines that there is a difference between the direction of the pressure transition at the upper side is different from the direction of the pressure transition at the lower side when the absolute value of the difference between the flag flaty_flg1 and the flag flatty_flg2 is "2". On the other hand, when the absolute value of the difference between the flag flaty_flat1 and the flag flatty_flg2 is not "2", the CPU 21 determines that there is no difference between the direction of the pressure transition at the upper side and the direction of the pressure transition at the lower side. When the absolute value is "2", the CPU 21 proceeds to Step 414. In Step 414, the unevenness counting number flaty_cnt in vertical direction is increased by 1 and updated. On the other hand, when the absolute value is not "2", the unevenness counting number flaty_cnt in vertical direction is not updated.

The CPU executes the aforementioned process relative to cells in the row (ii) and the all columns except both ends (from the second column through the seventh column). Such process applied to all rows (from the first row through the seventh row) and finally the unevenness counting number flaty_cnt in vertical direction can be calculated.

In the embodiment of the present invention, the occupant of the seat is determined through the following process. First, the unevenness counting number flatx_cnt in horizontal direction is calculated based on partial pressures detected at the basic cell 13 and cells 13 provided at the left side and the right side relative to the basic cell 13. Specifically, the unevenness counting number flatx_cnt in vertical direction is calculated by counting the number of the basic cells 13 when the direction of the pressure transition at the left side of the basic cell 13 is different from the direction of the pressure transition at the right side of the basic cell 13. Second, the unevenness counting number flaty_cnt in vertical direction is calculated based on partial pressures detected at the basic cell 13 and cells 13 provided at the upper side and the lower side relative to the basic cell 13. Specifically, the unevenness counting number flaty_cnt in vertical direction is calculated by counting the number of the basic cells 13 when the direction of the pressure transition at the upper side of the basic cell 13 is different from the direction of the pressure transition at the lower side of the basic cell 13. Then, calculated unevenness counting number flatx_cnt in horizontal direction and flaty_cnt in vertical direction are added to obtain the seating surface unevenness counting number. The judging value is corrected based on the comparison between the seating surface unevenness counting number and the threshold TH_flat to determine the adult occupant correctly.

In the embodiment of the present invention, the judging value is corrected based on the comparison between the seating surface unevenness counting number and the threshold TH_flat to determine the adult occupant correctly, however, the judging value threshold TH may be corrected alternatively.

Further, in the embodiment of the present invention, the unevenness of the seat is determined by examining the transitions of the partial pressures at the basic cell 13 and its adjacent cells 13, however, if such cells 13 are provided closely, examined cells 13 may not be adjacent.

Furthermore, in the embodiment of the present invention, the coefficient 2 is deducted from the judging value based on the comparison between the seating surface unevenness counting number and the threshold TH_flat, however, the deducted coefficient may be changed depending on the calculated seating surface unevenness counting number. For example, when the large seating surface unevenness counting number means a high possibility that the CRS is attached to the seat, so that the coefficient may be increased.

Still further, in the embodiment of the present invention, the CRS is determined based on the corrected judging value by deducting the 2 from the judging value based on the comparison between the seating surface unevenness counting number and the threshold TH_flat, however, the CRS is determined based on the comparison between the seating surface unevenness counting number and the threshold TH_flat.

Yet still further, the CRS may be determined based on a comparison between the threshold TH_flat and either one of the vertical unevenness counting number flaty_cnt or the horizontal unevenness counting number flat_x cnt. This comparison may be reflected to the correction of the judging value.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A seating detector, comprising:

a plurality of cells provided at a seating surface of a seat to be defined by a two-dimensional array including rows and columns for detecting partial loads applied to the seating surface of the seat;

an unevenness calculating means for calculating the number of cells when a partial pressure detected at the each cell is larger than a partial pressure detected at one abutting cell positioned next to the cell at one side thereof in one direction and larger than a partial pressure detected at the other abutting cell positioned next to the cell at the other side thereof in one direction, or when a partial pressure detected at the each cell is smaller than a partial pressure detected at one abutting cell positioned next to the cell at one side thereof in one direction and smaller than a partial pressure detected at the other abutting cell positioned next to the cell at the other side thereof in one direction;

a determining means for determining that the seat is occupied by a child restraint system based on a comparison between the number of the cells calculated by the unevenness calculating means and a threshold.

2. A seating detector according to claim 1, wherein the seating detector further comprising:

a total load value calculating means for calculating a total load value by summing the all partial pressures detected at the respective cells;

a determining means for determining that the seat is occupied by an adult based on a comparison between the total load value calculated by the total load value calculating means and a judging threshold;

an unevenness calculating means in horizontal direction for calculating the number of cells when a partial pressure detected at the each cell is larger than a partial pressure detected at one abutting cell positioned next to the cell at one side thereof in horizontal direction and larger than a partial pressure detected at the other abutting cell positioned next to the cell at the other side thereof in horizontal direction, or when a partial pressure detected at the each cell is smaller than a partial pressure detected at one abutting cell positioned next to the cell at one side thereof in the horizontal direction and smaller than a partial pressure detected at the other abutting cell positioned next to the cell at the other side thereof in horizontal direction;

a correcting means correcting either one of the total load value or the judging threshold so as to control the occupant determination as an adult based on a comparison between the number of the cells calculated by the unevenness calculating means and a threshold.

3. A seating detector according to claim 1, wherein the seating detector further comprising:

a total load value calculating means for calculating a total load value by summing the all partial pressures detected at the respective cells;

a determining means for determining that the seat is occupied by an adult based on a comparison between the total load value calculated by the total load value calculating means and a judging threshold;

an unevenness calculating means in vertical direction for calculating the number of cells when a partial pressure detected at the each cell is larger than a partial pressure detected at one abutting cell positioned next to the cell at one side thereof in vertical direction and larger than a partial pressure detected at the other abutting cell positioned next to the cell at the other side thereof in vertical direction, or when a partial pressure detected at the each cell is smaller than a partial pressure detected at one abutting cell positioned next to the cell at one side thereof in the vertical direction and smaller than a partial pressure detected at the other abutting cell positioned next to the cell at the other side thereof in vertical direction;

a correcting means correcting either one of the total load value or the judging threshold so as to control the occupant determination as an adult based on a comparison between the number of the cells calculated by the unevenness calculating means and a threshold.

4. A seating detector, comprising:

a plurality of cells provided at a seating surface of a seat to be defined by a two-dimensional array including rows and columns for detecting partial loads applied to the seating surface of the seat;

an unevenness calculating means in a first direction for calculating the number of cells when a partial pressure detected at the each cell is larger than a partial pressure detected at one abutting cell positioned next to the cell at one side thereof in the first direction and larger than a partial pressure detected at the other abutting cell positioned next to the cell at the other side thereof in the first direction, or when a partial pressure detected at the each cell is smaller than a partial pressure detected at one abutting cell positioned next to the cell at one side thereof in the first direction and smaller than a partial pressure detected at the other abutting cell positioned next to the cell at the other side thereof in the first direction;

an unevenness calculating means in a second direction for calculating the number of cells when a partial pressure detected at the each cell is larger than a partial pressure detected at one abutting cell positioned next to the cell at one side thereof in the second direction and larger than a partial pressure detected at the other abutting cell positioned next to the cell at the other side thereof in the second direction, or when a partial pressure detected at the each cell is smaller than a partial pressure detected at one abutting cell positioned next to the cell at one side thereof in the second direction and smaller than a partial pressure detected at the other abutting cell positioned next to the cell at the other side thereof in the second direction;

an uneven cell totalizing means for adding the number of the cells calculated by the unevenness calculating means in the first direction to the number of the cells calculated by the unevenness calculating means in the second direction;

a determining means for determining that the seat is occupied by a child restraint system based on a comparison between the number of the cells calculated by the uneven cell totalizing means and a threshold.

5. A seating detector, comprising:

a plurality of cells provided at a seating surface of a seat to be defined by a two-dimensional array including rows and columns for detecting partial loads applied to the seating surface of the seat;

a total load value calculating means for calculating a total load value by summing the all partial pressures detected at the respective cells;

a determining means for determining that the seat is occupied by an adult based on a comparison between the total load value calculated by the total load value calculating means and a judging threshold;

an unevenness calculating means in a first direction for calculating the number of cells when a partial pressure detected at the each cell is larger than a partial pressure detected at one abutting cell positioned next to the cell at one side thereof in the first direction and larger than a partial pressure detected at the other abutting cell positioned next to the cell at the other side thereof in the first direction, or when a partial pressure detected at the each cell is smaller than a partial pressure detected at one abutting cell positioned next to the cell at one side thereof in the first direction and smaller than a partial pressure detected at the other abutting cell positioned next to the cell at the other side thereof in the first direction;

an unevenness calculating means in a second direction for calculating the number of cells when a partial pressure detected at the each cell is larger than a partial pressure detected at one abutting cell positioned next to the cell at one side thereof in the second direction and larger than a partial pressure detected at the other abutting cell positioned next to the cell at the other side thereof in the second direction, or when a partial pressure detected at the each cell is smaller than a partial pressure detected at one abutting cell positioned next to the cell at one side thereof in the second direction and smaller than a partial pressure detected at the other abutting cell positioned next to the cell at the other side thereof in the second direction;

an uneven cell totalizing means for adding the number of the cells calculated by the unevenness calculating means in the first direction to the number of the cells calculated by the unevenness calculating means in the second direction;

a correcting means correcting either one of the total load value or the judging threshold so as to control the occupant determination as an adult based on a comparison between the total number of the cells calculated by the uneven cell totalizing means and a threshold.

* * * * *